Oct. 21, 1924.
P. R. HANCOCK
CLUTCH
Filed May 8, 1923
1,512,760
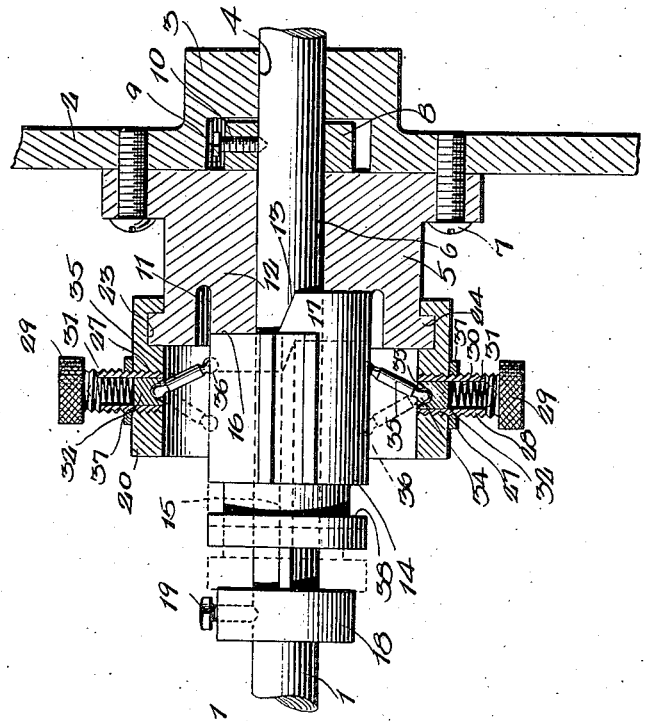
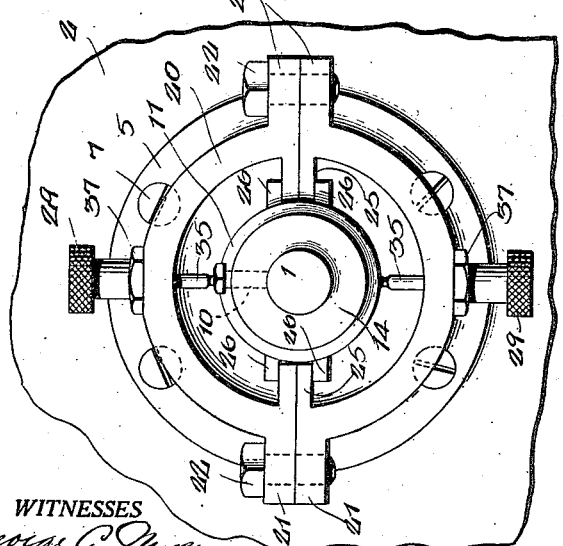
WITNESSES
INVENTOR
P. R. HANCOCK,
BY
ATTORNEYS Patented Oct. 21, 1924.

1,512,760

UNITED STATES PATENT OFFICE.

PHILIP RICHARD HANCOCK, OF BUTTE, MONTANA.

CLUTCH.

Application filed May 8, 1923. Serial No. 637,520.

*To all whom it may concern:*

Be it known that I, PHILIP R. HANCOCK, a subject of the King of England, and resident of Butte, in the county of Silver Bow and State of Montana, have invented certain new and useful Improvements in Clutches, of which the following is a specification.

My invention relates generally to clutches, more particularly to clutches of the jaw type of construction and it consists in the combinations, constructions and arrangements herein described and claimed.

An object of the invention is to provide a clutch mechanism having a pair of cooperative jaw members adapted to be moved into and out of driving engagement with each other and means adjustable to positively hold the jaw members in either engaged or disengaged relation in respect to each other or to hold the jaw members in engagement with each other until a predetermined load has been imposed on one of the jaw members, whereupon the jaw members will move relatively until completely out of engagement with each other and will be held out of engagement with each other until actuated by a positively applied external force.

A further object of the invention is to provide a device of the character described in which the adjustable means for releasably holding the jaw members either in or out of engagement with each other can be adjusted to vary the resistance which will be opposed to stresses tending to move the jaw members relatively to each other.

A further object of the invention is to provide a clutch of the character described which is relatively simple in construction, adapted to be incorporated in transmissions and driving mechanisms of various known types, not likely to get out of order easily and thoroughly effective for the purpose intended.

Other objects and advantages will be apparent from the following description, considered in conjunction with the accompanying drawings, in which—

Figure 1 is an end view of a clutch mechanism embodying the invention, and

Figure 2 is a view mainly in longitudinal vertical section and partly in side elevation of the mechanism exhibited in Figure 1.

Referring to the drawings, 1 designates a shaft which may be a part of a transmission or drive mechanism of any known type of construction. The shaft 1 may be supported for rotation about its axis in any suitable known manner, no supporting means therefor being shown.

A fragmentary portion of an element 2 which is to be driven and which may be a pulley, gear, or like element, is shown as having a hub portion 3 provided with an axial bore 4 through which the shaft 1 loosely extends. A clutch member 5 is formed with an axial bore 6 receiving the shaft 1 and is disposed on the shaft 1 so that one end of the clutch member 5 is in flatwise contiguous relation to the driven element 2 and is detachably secured to the latter through the agency of screws or bolts 7 so that the driven element 2 and the clutch member 5 are loosely mounted on the shaft 1 and will rotate as a unit about the axis of the shaft. The driven element 2 and the clutch member 5 are held against any appreciable movement longitudinally of the shaft 1 by a stop collar 8 which is disposed within a counter-bore 9 in the end of the hub portion 3 proximate to the clutch member 5 and is secured to the shaft 1 by a set screw 10.

The clutch member 5 is formed to provide an annular groove 11 in the end thereof remote from the driven element 2 and the portion of the end wall of the clutch member circumscribed by the annular groove 11 is fashioned to form a projection or jaw 12 and a recess 13.

A second or driving clutch member 14 is feathered to the shaft 1, as indicated at 15, and has the end wall thereof proximate to the clutch member 5 fastened to provide a recess 16 adapted to receive the jaw 12 and a jaw or projection 17 adapted to enter and engage with the recess 13. The clutch member 14 preferably is formed to have an outer diameter slightly less than the inner diameter of the annular groove 11 and the jaw or projection 12 preferably is of less length than the depth of the annular groove 11 so that the body of the clutch member 14 will extend slightly beyond the plane of the adjacent end of the clutch member 5 when the clutch members are in engagement with each other as indicated by the full lines in Figure 2.

It is to be observed at this point that the confronting contiguous walls of the jaws or projections 12 and 17 are cooperatively beveled or inclined and lie in planes intersecting the longitudinal axis of the shaft 1 at an oblique angle, whereby a torque on one of the clutch members when the other clutch member is held against rotation will tend to cause the clutch member 14 to slide on the shaft 1 out of engagement with the clutch member 5.

A stop collar 18 secured to the shaft 1 by a set screw 19 constitutes a means for limiting movement of the clutch member 14 longitudinally of the shaft in the direction opposite to the clutch member 5.

The means for holding the clutch member 14 against movement longitudinally of the shaft 1 until actuated in response to a predetermined load or force will now be described. Such means includes a carrying ring 20 which preferably is of the split ring type of construction and comprises two half portions having at the edges thereof pairs of cooperative outwardly extending radial lugs 21, the lugs of each pair being secured to each other by bolts 22. The carrying ring so formed is rotatably mounted adjacent to one of its ends on the clutch member 5, being formed with an annular groove 23 adjacent to such end thereof into which an outwardly extending annular rib 24 on the adjacent end portion of the clutch member 5 extends so that the carrying ring 20 will be held against axial movement relatively to the clutch member 5 although being free to rotate independently of the latter. With the arrangement described, the carrying ring 20 is supported in spaced concentric encircling relation to the clutch member 14. Inwardly extending radial lugs 25 comprising pairs of cooperative lug sections formed integrally with the two sections of the split ring 20 have the inner end portions thereof received between spaced apart outwardly extending radial lugs 26 on the clutch member 14 so that the carrying ring 20 will be sustained at points intermediate its length and thus securely held in concentric relation to the clutch member 14 and moreover the carrying ring 20 will be caused to rotate with the clutch member 14 as a unit although the clutch member 14 is permitted to slide longitudinally of the shaft 1 independently of the carrying ring 20.

The carrying ring 20 has a plurality of radial openings 27 formed through the portion thereof overlying the clutch member 14 and each of the radial openings 27 is provided with screw threads for engaging the screw threads on the shank 28 of a headed adjusting screw or plug 29. The adjusting screws or plugs 29 are of relatively great length and each is provided with an axial socket 30 in the shank thereof, the socket being open at the free end of the shank. An expansion spring 31 reacting at one end against the bottom of the socket and at its other end against a slidable presser block 32 which also is disposed in the socket tends to move the presser block toward the open end of the socket. Each presser block 32 is provided with a concaved or angular seat 33 in its outer face receiving a rounded end 34 of a locking pin 35, the other end of which also is rounded and is disposed in a concavely curved or angular socket or seat 36 in the outer wall of the clutch member 14. Each holding pin 35 is of greater length than the radial distance between the inner wall of the ring 20 and the outer wall of the clutch member 14 and in consequence will normally be inclined in respect to the transverse axis of the clutch member 14.

From the foregoing description of the various parts of the device, the operation thereof may be readily understood. When the clutch member 14 is in engagement with the clutch member 5 as indicated by the full lines in Figure 2, the holding pins 35 will be inclined toward the plane of the adjacent end of the clutch member 5, and will be yieldingly held in such inclined positions by the pressure of the springs 31 against the presser blocks 32.

The clutch member 14 thus will be held against movement longitudinally of the shaft 1 in the direction opposite to the clutch member 5 until a force acts on the clutch member 5 sufficient to overcome the torque causing the clutch members 5 and 14 to rotate as a unit so that the rotation of the clutch member 5 will be retarded and the inclined face of the jaw 17 will ride up the inclined face of the jaw 12 and the clutch member 14 will be cammed longitudinally of the shaft 1, thereby forcing the presser blocks 32 outwardly in the sockets 30 until the holding pins 35 have moved pivotally on their outer ends from the positions indicated by the full lines in Figure 2 slightly beyond positions in which they are disposed in a plane intersecting the clutch member 14 at right angles, whereupon the springs 31 will act to move the holding pins 35 to the positions indicated by the dotted lines in Figure 2. When the holding pins 35 are in the positions indicated by the dotted lines in Figure 2, the clutch member 14 will be held against movement toward a position to engage with the clutch member 5.

It will be apparent that the force required to effect movement of the clutch member 14 longitudinally of the shaft 1 against the action of the springs 31 may be varied by manipulating the adjusting screws 29 to vary the tension on the springs 31. The adjusting screws 29 may be locked in position when a desired adjustment has been secured through the agency of lock nuts 37 which are in threaded engagement with the shanks of the adjusting screws.

The clutch member 14 may be returned to position to engage with the clutch member 5 in any suitable known manner as by means of a shifter lever (not shown) which may be of any usual type of construction and may have portions or connect with parts engageable with an annular groove 38 in the outer wall of the end portion of the clutch member 14 proximate to the stop collar 18.

It also will be manifest that I may provide any desirable number of cooperative jaws and recesses on the confronting faces or ends of the clutch members 5 and 14 without departing from the spirit and scope of the invention.

In order to positively lock the clutch member 14 against movement longitudinally of the shaft 1 from either the position indicated by the full lines in Figure 2 or the position indicated by the dotted lines in the same figure it is only necessary to tighten the adjusting screws 29 until the springs 31 are fully compressed. The holding pins 35 then will be held against movement from the full line positions to the dotted line positions or vice versa and the clutch member 14 will be positively locked in engagement with the clutch member 5 or out of engagement with the clutch member 5, the position of the clutch member 14 in respect to the clutch member 5 being determined by its position when the adjusting screws are tightened to fully compress the springs 31. When the adjustment of the screws 29 is such as to cause the clutch member 14 to be yieldingly held against movement longitudinally of the shaft, any variation in the load on the clutch member 5 will cause slight relative movement of the cooperative jaws of the two clutch members and therefore the clutch jaws cannot become set in engagement with each other and are always in position to move apart when a predetermined load has been imposed upon the clutch member 5. Since all the relatively moving parts of the device are mounted on a single shaft, it will be obvious that there will be no end thrust on the shaft or on the relatively moving parts to cause friction and wear.

Obviously, my invention is susceptible of embodiment in forms other than that illustrated in the accompanying drawing, and I therefore consider as my own all modifications and adaptations of the form of the device herein disclosed which fairly fall within the scope of the appended claims.

Having thus described the invention, what I claim is:—

1. In a clutch, a freely rotatable clutch member, a clutch member axially aligned with the first clutch member and movable axially to and from position to engage with the latter, said clutch members having cooperative jaws on their confronting faces, the contiguous walls of said jaws when the clutch members are engaged with each other lying in planes inclined in respect to the axis of rotation of the second clutch member, a carrying ring disposed in spaced concentric relation to the second clutch member and being held against axial movement relatively to the first clutch member, and inwardly pressed yieldable means extending obliquely between the inner wall of the carrying ring and the outer wall of the second clutch member for yieldingly holding the latter from disengaging the first clutch member.

2. In a clutch, a freely rotatable clutch member, a clutch member axially aligned with the first clutch member and movable axially to and from position to engage with the latter, said clutch members having cooperative jaws on their confronting faces, the contiguous walls of said jaws when the clutch members are engaged with each other lying in planes inclined in respect to the axis of rotation of the second clutch member, a carrying ring disposed in spaced eccentric relation to the second clutch member and being held against axial movement relatively to the first clutch member, and inwardly pressed yieldable means extending obliquely between the inner wall of the carrying ring and the outer wall of the second clutch member for yieldingly holding the latter from disengaging the first clutch member, and means whereby the pressure pressing said holding means inwardly may be varied at will.

3. In a clutch, a freely rotatable clutch member, a clutch member axially aligned with the first clutch member and movable axially to and from position to engage with the latter, said clutch members having cooperative jaws on their confronting faces, the contiguous walls of said jaws when the clutch members are engaged with each other lying in planes inclined in respect to the axis of rotation of the second clutch member, a carrying ring disposed in spaced concentric relation to the second clutch member and being held against axial movement relatively to the first clutch member, said ring being held to rotate with said second clutch member and having a radial opening formed through its walls, a screw plug threadedly engaging said radial opening and having an axial socket open at the inner end of the plug, a spring pressed presser block slidable in the socket and being urged toward the inner end of the plug, and a holding pin having rounded ends fulcrumed respectively in a seat on the outer wall of the second clutch member and on the inner face of said presser plug, the combined length of said pin and said presser block being greater than the radial distance between the bottom of the seat in the outer wall of the second clutch member and the inner wall of said carrying ring, whereby said pin will be urged continuously toward a position in which it is inclined in respect to the outer wall of said second clutch member.

4. In a clutch, a freely rotatable clutch member, a clutch member axially aligned with the first clutch member and movable axially to and from position to engage with the latter, said clutch members having cooperative jaws on their confronting faces, the contiguous walls of said jaws when the clutch members are engaged with each other lying in planes inclined in respect to the axis of rotation of the second clutch member, a carrying ring disposed in spaced concentric relation to the second clutch member and being held against axial movement relatively to the first clutch member, said ring being held to rotate with said second clutch member and having a radial opening formed through its walls, a screw plug threadedly engaging said radial opening and having an axial socket open at the inner end of the plug, a spring pressed presser block slidable in the socket and being urged toward the inner end of the plug, and a holding pin having rounded ends fulcrumed respectively in a seat on the outer wall of the second clutch member and on the inner face of said presser plug, the combined length of said pin and said presser block being greater than the radial distance between the bottom of the seat in the outer wall of the second clutch member and the inner wall of said carrying ring, whereby said pin will be urged continuously toward a position in which it is inclined in respect to the outer wall of said second clutch member, and a stop for limiting the movement of the second clutch member away from the first clutch member.

PHILIP RICHARD HANCOCK.